Dec. 11, 1962 J. J. DAVIDSON 3,068,327
TRANSISTOR AMPLIFIER CIRCUIT
Filed Oct. 2, 1958

INVENTOR.
JAMES J. DAVIDSON
BY
[signature]
ATTORNEY

United States Patent Office 3,068,327

Patented Dec. 11, 1962

3,068,327

TRANSISTOR AMPLIFIER CIRCUIT

James J. Davidson, Delaware Township, Camden County, N.J., assignor to Radio Corporation of America, a corporation of Delaware Filed Oct. 2, 1958, Ser. No. 764,906
3 Claims. (Cl. 179—100.2)

Figure 1:
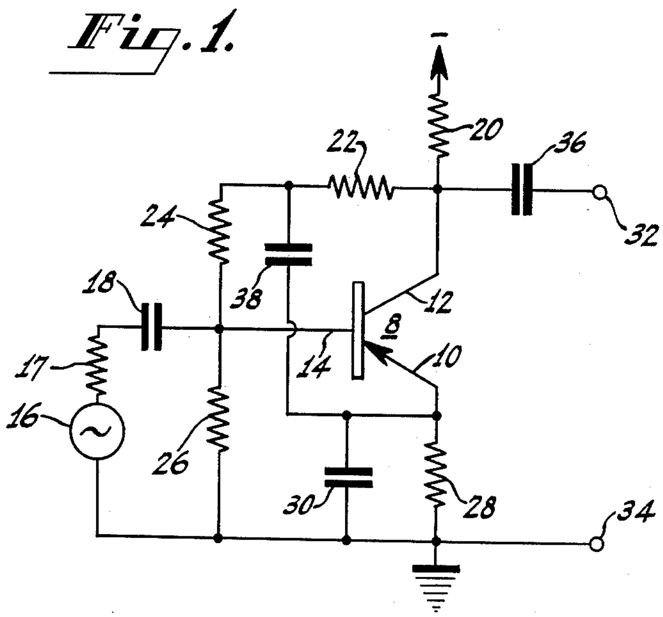

This invention relates to transistor amplifier circuits and in particular to transistor amplifier circuits suitable for use as the preamplifier of audio frequency signals in magnetic tape playback systems.

Transistors are ideally suited, particularly because of their low noise and high gain characteristics, as preamplifiers of the audio frequency output signals from signal transducers such as phonograph pickup or magnetic tape playback heads. Transistors, however, are temperature sensitive. That is, their operating characteristics vary with variations in temperature. Thus, circuitry must be provided to stabilize the transistor operating point if, for example, the ambient temperature varies. The known stabilizing circuits, however, degenerate the signal and reduce the effective gain of the amplifier so that circuitry must also be provided to prevent signal degeneration. In addition to suitable stabilization circuitry, the transistor preamplifier circuit must include a frequency equalization network to compensate for the frequency characteristics of the phonograph or magnetic tape system. Because of these considerations, the known circuitry which is suitable for these applications contains a relatively large number of circuit elements which increases the circuit cost.

It is, accordingly, an object of this invention to provide an improved transistor amplifier circuit suitable for use as the preamplifier for signal transducers, such as magnetic tape playback heads, phonograph pickups and the like.

It is another object of this invention to stabilize the circuit operation and provide frequency equalization of a transistor preamplifier circuit for signal transducers.

It is yet another object of this invention to provide an improved transistor preamplifier circuit for a magnetic tape playback system, wherein the operating point of the transistor is stabilized despite variations in temperature, and frequency equalization for the output characteristics of the magnetic playback head is provided.

A transistor preamplifier circuit embodying the invention is stabilized by a collector-to-base direct current feedback circuit and by a degenerative emitter stabilizing resistor. To prevent degenerative signal feedback through the collector-to-base feedback circuit and to provide frequency equalization, a bypass and equalization capacitor is connected from a point on the collector-to-base feedback circuit to a point of reference potential in the circuit, such as ground. This capacitor bypasses the high frequency signals, thus preventing negative signal feedback to the base and forms, in combination with a portion of the feedback resistance, a time constant network which provides the desired frequency equalization. Thus, stable circuit operation and the desired frequency equalization are provided with a minimum number of circuit elements.

Figure 2:
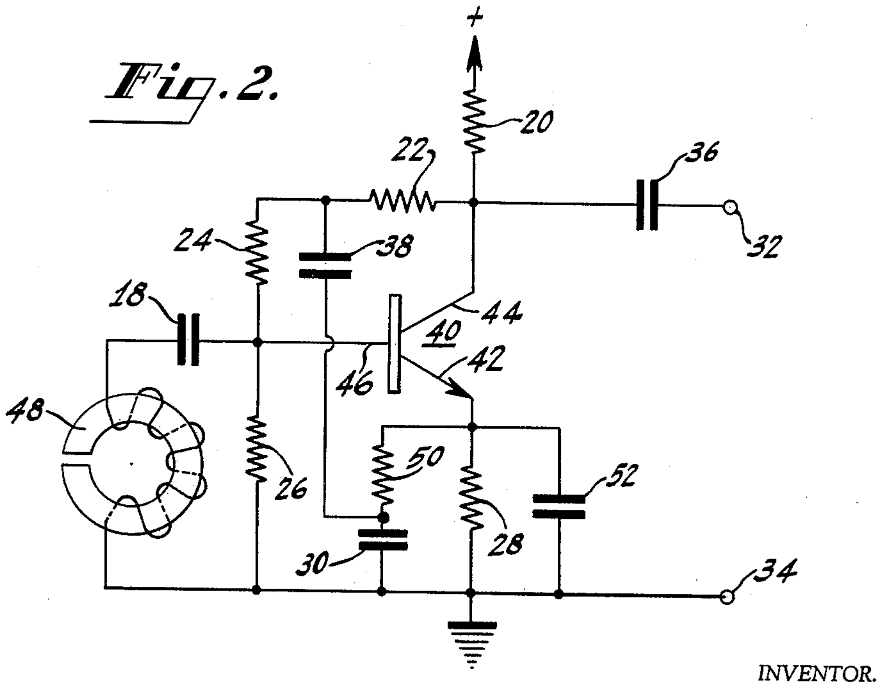

The invention will best be understood from the following description, when read in connection with the accompanying drawing in which:

FIGURE 1 is a schematic circuit diagram of an improved transistor preamplifier circuit utilizing a P-N-P transistor and embodying the invention; and FIGURE 2 is a schematic circuit diagram of a transistor preamplifier circuit utilizing an N-P-N transistor and embodying the invention.

Referring now to the drawing wherein like parts are indicated by like reference numerals in both figures, and referring in particular to FIGURE 1, a preamplifier circuit suitable for use in audio frequency sound reproducing systems, such as phonograph or magnetic tape playback systems, includes a transistor 8, which may be considered to be of N type conductivity and specifically, a junction transistor of P-N-P type. The transistor 8 includes an emitter 10, a collector 12, and a base 14. Input signals from a source 16, which will be assumed to have internal impedance as shown by the resistor 17 and whose output voltage varies with variations in frequency, are applied between the base 14 and emitter 10 of the transistor. To this end, one terminal of the source 16 is connected through a coupling capacitor 18 to the base 14, while the other terminal of the source 16 is connected to a common point in the circuit such as a point of fixed reference potential or ground. To supply collector biasing voltages to the transistor, the collector is connected through a load resistor 20 to the negative terminal of a source (not shown) of direct current energizing voltage. Stabilization of the circuit is provided by connecting a pair of resistors 22 and 24 from the collector 12 to the base 14 and by connecting a resistor 26 between the base 14 and ground. The resistor 26, in combination with the resistors 22 and 24, comprises a voltage divider for providing a fixed base bias voltage for the transistor. The resistors 22 and 24 provide direct current collector-to-base feedback stabilization of the circuit. Stabilization is additionally provided by connecting a degenerative resistor 28 between the emitter 10 and ground. This resistor is bypassed for signal frequencies by a bypass capacitor 30. Output signals are derived from between the collector 12 and emitter 10 of the transistor 8 by means of a pair of output terminals 32 and 34. The output terminal 32 is connected to the collector through a coupling capacitor 36, while the output terminal 34 is connected to the common circuit point or ground.

As thus far described, the circuit embodying the invention is conventional. That is to say, it employs conventional biasing techniques to stabilize the operating point of the transistor. The circuit as thus far described, however, does not eliminate degenerative signal feedback between the collector and base electrodes and does not include equalization circuitry for compensating for the variable response of the signal source 16 with variations in frequency. In accordance with the prior art circuits, degenerative signal feedback could be eliminated by connecting an electrolytic capacitor of relatively large magnitude from the junction of the resistors 22 and 24 to ground. This would bypass signals in the feedback path to ground and prevent the undesirable effects of the degenerative signal feedback between the collector and base. To provide the desired frequency equalization, a resistance-capacitance time constant network comprising a series resistor and capacitor would, in accordance with known circuitry, be connected between the collector 12 and ground. This network, in combination with the collector load resistor 20, the transistor output impedance, and the biasing resistor 22, would provide the desired frequency equalization. The disadvantage of the conventional circuitry is that two capacitors, one generally being an expensive and bulky electrolytic capacitor and a separate equalization network are required, thus adding to the circuit size and cost.

In accordance with the present invention, degenerative high frequency signal feedback between the collector and base electrodes is eliminated and the desired frequency equalization is provided by connecting a capacitor 38 from the junction of the feedback resistors 22 and 24 to the emitter 10, which is connected to the junction of the stabilization resistor 28 and the capacitor 30. The capacitor 38 is of such capacitance value that it, in combination with the capacitor 30, bypasses high frequency signals, which would ordinarily be fed back from the collector to the base, to ground and, in addition, provides, in combination with the feedback resistor 22 and the load resistor 20, a frequency equalization network to compensate for the variable frequency response of the signal source 16. Thus, in accordance with the invention, a resistor, and a capacitor which conventionally would be an electrolytic capacitor, are eliminated. While the capacitor 38 is preferably connected as illustrated it could, alternatively, be connected from the junction of the resistors 22 and 24 to ground. It has been found that the connection illustrated provides greater gain at low frequencies, and is thus preferred.

As the operating characteristics of the transistor tend to vary for any reason, as, for instance, because of a variation in ambient temperature, the emitter and collector current will tend to vary. The emitter current flows through the resistor 28, providing a degenerative voltage drop thereacross and tending to stabilize the transistor 8. In addition, any variation in collector current will provide, through the feedback circuit comprising the resistors 22 and 24, a bias current for the base 14 which tends to compensate for the original variation in collector current flow. If, for example, the direct current collector current increases, the voltage drop across the resistor 20 will make the collector less negative and decrease, through the feedback circuit, the direct current base bias thus tending to decrease the collector current and compensating for the original increase in collector current. As was noted hereinbefore, degenerative signal feedback from the collector 12 to the base 14 which would tend to decrease the gain of the transistor 8 is reduced and substantially eliminated at high frequencies by the connection of the capacitor 38, which, in combination with the capacitor 30, provides a bypass for signals to ground. Moreover, signal degeneration across the degenerative stabilizing resistor 28 is prevented by bypassing this resistor with the capacitor 30.

When a signal is applied from the signal source 16 between the base 14 and emitter 10 of the transistor 8, an amplified signal current will flow in the collector circuit. As was explained hereinbefore, the characteristics of the signal source 16 are such that its output signal voltage varies with variation in frequency. It will be assumed, moreover, that the output voltage increases as the frequency increases, which is a characteristic of a transducer such as a magnetic tape playback head. Without equalization circuitry this would mean that the output signal voltage at the terminals 32 and 34 would also increase with frequency. Thus, the frequency response of the circuit would not be uniform, which is undesirable. In accordance with the invention, however, the time constant of the network comprising the resistors 20 and 22 and the capacitor 38 is chosen so as to provide the desired frequency equalization and provide an overall frequency response for the circuit which is substantially uniform. If, for example, the amplifier is to be used with a tape recorder playback amplifier that utilizes the NARTB (National Association of Radio and Television Broadcasters) standard playback characteristics, the time constant of the resistor 22 and capacitor 38 will be chosen to be approximately 50 microseconds while the time constant of the resistor 22, the output impedance of the transistor, and the capacitor 38 will be approximately 3,180 microseconds. At high frequencies, the impedance of the capacitor 38 is relatively small and a low impedance path to ground is provided by the equalization network, thus decreasing the output voltage. At low frequencies, however, the impedance of the capacitor is relatively large and the impedance of the equalization network is correspondingly high. Thus, frequency equalization is provided to compensate for the variable frequency response of the signal source 16. Equalization is provided, moreover, and in accordance with the invention, without the need of a separate equalization network.

In FIGURE 2, reference to which is now made, a transistor 40 of P type conductivity, which may be considered to be of the N-P-N junction type, includes emitter 42, collector 44 and base 46 electrodes and is connected to amplify signals from a magnetic tape playback head 48. The playback head 48 supplies signals through the capacitor 18 to the base 46. The collector-to-base feedback network is identical to the circuit illustrated in FIGURE 1, as is the connection of the base biasing resistor 26 and the degenerative stabilizing resistor 28. The output signal is derived as in FIGURE 1 from between the collector and emitter of the transistor by means of the output terminals 32 and 34. Since the transistor 40 is of the N-P-N junction type, the collector 44 is connected through the load resistor 20 to a positive source (not shown) of direct current energizing potential. Another difference in the circuit of FIGURE 2 is that a resistor 50 is connected from the emitter 42 in series with the bypass capacitor 30 to ground and a second bypass capacitor 52 is connected in shunt with the resistor 28. The bypass and equalization capacitor 38 is connected from the junction of the resistors 22 and 24 to the junction of the resistor 50 and the capacitor 30.

The capacitor 30 bypasses the resistor 28 and prevents high frequency signal degeneration across this resistor. The resistor 50, which is of relatively small resistance, provides a small amount of signal degeneration and thus negative feedback which stabilizes the gain of the transistor 40 over the range of frequencies of the signals which are to be amplified. The capacitor 52 has capacitance of a value to bypass the resistor 50 at the high end of the frequency range, thus increasing the gain slightly for high frequency signals. Aside from these differences, the circuit illustrated in FIGURE 2 is similar to the circuit of FIGURE 1 and operates in the same manner to provide, through the novel circuitry described, frequency equalization as well as stable circuit operation.

Circuits of the type illustrated in both figures have been built and tested with a magnetic tape playback system. The load for the novel transistor preamplifier circuit was of high impedance and comprised a vacuum tube amplifier, the plate supply of which was also used to bias the transistor preamplifier. It is also to be noted that, in the playback system built and tested, the low frequency time constant was 3180 microseconds while the high frequency time constant was 120 microseconds, as opposed to the NARTB playback characteristic high frequency time constant of 50 microseconds. The following circuit values, by way of example, were used for the various circuit components:

| | | |
|---|---|---|
| Supply voltage | volts | +190 |
| Resistor 20 | ohms | 560,000 |
| Resistor 22 | do | 3,300 |
| Resistor 24 | do | 100,000 |
| Resistor 26 | do | 150,000 |
| Resistor 28 | do | 22,000 |
| Resistor 50 | do | 100 |
| Capacitor 18 | microfarads | 100 |
| Capacitor 30 | do | 100 |
| Capacitor 36 | do | .047 |
| Capacitor 38 | do | .033 |
| Capacitor 52 | do | .033 |

An improved transistor preamplifier circuit embodying the invention is stable in operation and provides signal amplification with a substantially flat overall frequency response, even though a signal source with a variable frequency response is used. These results are obtained, moreover, with a minimum number of circuit elements. Thus, circuits embodying the invention are ideally suited for use as the preamplifier in magnetic tape playback systems.

What is claimed is:

1. A transistor preamplifier circuit for an amplifier system comprising, in combination, a transistor including base, emitter, and collector electrodes, means providing a signal source in which the high frequency signal components are emphasized in amplitude to a greater degree than the lower frequency components coupled to said base electrode and to a common circuit point of said system, a resistive collector load impedance element connected between said collector electrode and a direct current supply source to provide variations in direct collector voltage in response to collector current variations, direct current conductive feedback means including a first and a second resistor serially connected in the order named between said collector and base electrodes to provide a base bias current for said transistor in response to said collector voltage variations to compensate for said variations in collector current, a degenerative stabilizing resistor connected between said emitter electrode and said common circuit point, a by-pass capacitor connected in shunt with said stabilizing resistor to prevent signal degeneration thereacross, a by-pass and frequency equalization capacitor connected from the junction of said first and second resistors to a point intermediate said emitter electrode and said stabilizing resistor, said by-pass and frequency equalization capacitor having capacitance of a value to prevent high frequency signal feedback between said collector and base electrodes through said feedback means and to provide with said collector load impedance element and said first resistor an equalization network having a time constant of a value to provide a substantially flat frequency response for said system, and means connected for deriving an output signal from between said collector electrode and said common circuit point.

2. A preamplifier circuit for amplifying signals from a playback head the output voltage of which increases as frequency increases for a constant amplitude recording signal the variable frequency response thereof comprising, in combination, a transistor including base, emitter, and collector electrodes, a direct-current supply source including a pair of terminals, a load resistor connected between said collector electrode and one terminal of said source, said load resistor providing variations in the collector voltage of said transistor in response to variation in collector current thereof, a direct-current feedback stabilizing circuit comprising a first and second resistor serially and direct-current conductively connected in the order named between said collector and base electrodes to vary the base bias current of said transistor in response to said variation in collector voltage to compensate for said variation in collector current, a base bias resistor connected between said base electrode and the other terminal of said source, a degenerative stabilizing resistor connected between said emitter electrode and said other terminal of said source, means connecting said playback head between said base electrode and said other terminal of said source for applying signals between said base and emitter electrodes, a relatively low resistance resistor and a first by-pass capacitor connected in series in the order named between said emitter electrode and said other terminal of said source in shunt with said degenerative stabilizing resistor, said low resistance resistor providing a relatively small amount of negative signal feedback for said transistor to stabilize the gain thereof, said by-pass capacitor providing a by-pass for signals to prevent signal degeneration across said degenerative stabilizing resistor, a by-pass and equalization capacitor connected from the junction of said first and second resistors to the junction of said low resistance resistor and by-pass capacitor, said by-pass and equalizing capacitor having capacitance of a value to provide a signal by-pass to said other terminal of said source through said first by-pass capacitor to prevent degenerative feedback of high frequency signals through said feedback stabilizing circuit and to provide with said load and first resistors an equalization network having a time constant to provide attenuation of the high frequency components of signals from said playback head relative to the low frequency components so that the frequency vs. amplitude characteristic of said preamplifier circuit compensates for the variable frequency response of said playback head, and output circuit means connected between said collector and said other terminal of said source for deriving an amplified signal from between said collector and emitter electrodes.

3. A pre-amplifier circuit as defined in claim 2 wherein a second by-pass capacitor is connected in shunt with said degenerative stabilizing resistor between said emitter and said other terminal of said source to by-pass signals and prevent signal degeneration across said low resistance resistor at relatively high frequencies.

References Cited in the file of this patent

UNITED STATES PATENTS

| | | |
|---|---|---|
| 2,750,456 | Waldhauer | June 12, 1956 |
| 2,789,164 | Stanley | Apr. 16, 1957 |
| 2,822,430 | Lin | Feb. 4, 1958 |
| 2,866,859 | Stanley | Dec. 30, 1958 |
| 2,901,556 | Chapman | Aug. 25, 1959 |
| 2,919,313 | Johnson | Dec. 29, 1959 |
| 2,977,546 | Molnar | Mar. 28, 1961 |

OTHER REFERENCES

Tape Recorder Circuits, Burstein and Pollak; Gernsbeck Library (No. 67), 1957; pages 122–23.

Pugh: "Portable Tape Recorder Amplifier," Radio and TV News, July 1957, pages 57–59, 88 and 89.